(12) United States Patent
Wang et al.

(10) Patent No.: US 7,263,250 B1
(45) Date of Patent: Aug. 28, 2007

(54) OPTICAL SWITCH USING POLARIZATION BEAM SPLITTERS

(75) Inventors: Steven Wang, San Jose, CA (US); William Freeman, Castro Valley, CA (US); Frank H. Levinson, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/370,893

(22) Filed: Feb. 20, 2003

Related U.S. Application Data

(60) Provisional application No. 60/419,610, filed on Oct. 18, 2002.

(51) Int. Cl.
G02B 6/00 (2006.01)
G02B 6/26 (2006.01)
G02B 6/42 (2006.01)

(52) U.S. Cl. ............................ 385/16; 385/11; 385/15; 385/17; 385/18; 385/31; 385/36

(58) Field of Classification Search .................. 385/11, 385/15, 16, 17, 18, 31, 36; 398/43
See application file for complete search history.

(56) References Cited

U.S. PATENT DOCUMENTS

| | | | | |
|---|---|---|---|---|
| 5,299,054 A * | 3/1994 | Geiger | ........................ | 359/251 |
| 5,321,774 A * | 6/1994 | Barnard et al. | ................ | 385/16 |
| 5,512,907 A * | 4/1996 | Riza | ............................. | 342/375 |
| 5,596,667 A * | 1/1997 | Watanabe | .................... | 385/122 |
| 5,982,539 A * | 11/1999 | Shirasaki | .................... | 359/484 |
| 6,049,426 A | 4/2000 | Xie et al. | | |
| 6,256,137 B1 * | 7/2001 | Hironishi | ..................... | 359/332 |
| 6,271,952 B1 * | 8/2001 | Epworth | ..................... | 398/147 |
| 6,282,025 B1 | 8/2001 | Huang et al. | | |
| 6,298,027 B1 * | 10/2001 | Wilde et al. | ........... | 369/112.02 |
| 6,331,910 B1 * | 12/2001 | Dultz et al. | ................. | 359/246 |
| 6,360,037 B1 * | 3/2002 | Riza | ............................. | 385/22 |
| 6,373,631 B1 | 4/2002 | Huang et al. | | |
| 6,538,818 B2 * | 3/2003 | Holmes | ...................... | 359/618 |
| 6,577,430 B1 * | 6/2003 | Jin et al. | ..................... | 359/280 |
| 6,580,846 B1 * | 6/2003 | Burroughs et al. | ........... | 385/16 |
| 6,618,519 B2 * | 9/2003 | Chang et al. | ................. | 385/18 |
| 6,680,797 B2 * | 1/2004 | Juday | ......................... | 359/484 |
| 2002/0186918 A1 * | 12/2002 | Burroughs | .................. | 385/18 |
| 2002/0194165 A1 * | 12/2002 | Smith | ............................ | 707/3 |
| 2003/0021519 A1 * | 1/2003 | Zalevsky et al. | ............. | 385/16 |
| 2003/0113055 A1 * | 6/2003 | Zhao et al. | ................... | 385/16 |
| 2003/0185495 A1 * | 10/2003 | Baron et al. | .................. | 385/18 |
| 2003/0194165 A1 * | 10/2003 | Silberberg et al. | ........... | 385/11 |
| 2004/0052456 A1 * | 3/2004 | Boffi et al. | ................... | 385/31 |

* cited by examiner

*Primary Examiner*—Frank G. Font
*Assistant Examiner*—Mary El-Shammaa
(74) *Attorney, Agent, or Firm*—Workman Nydegger

(57) ABSTRACT

A polarization based optical switch capable of redirecting light signals to a plurality of different output locations. The optical switch utilizes polarization beam splitters to separate each optical channel into multiple polarization portions. Reflection members are used to redirect some of the polarization portions. Polarization rotators are capable of manipulating the plane of polarization of the polarization portions which will determine which of the output locations each optical channel transmits through. Another polarization beam splitter is used to recombine the polarization portions and direct them to one of the output locations depending on their respective planes of polarization.

32 Claims, 8 Drawing Sheets

OPTICAL SWITCH USING POLARIZATION BEAM SPLITTERS

CROSS-REFERENCE TO RELATED APPLICATIONS

This application claims the benefit of U.S. Provisional Patent Application Ser. No. 60/419,610, entitled "Polarization Based Optical Switch," filed Oct. 18, 2002, which is incorporated herein by reference.

BACKGROUND OF THE INVENTION

1. The Field of the Invention

This invention relates generally to the field of optical switching devices for use in optical networks. In particular, embodiments of the present invention relate to a polarization based optical switch that is useful for switching optical signals in an optical networking environment.

2. The Relevant Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on copper conductor.

Many conventional electrical networks are being upgraded to optical networks to take advantage of the increased speed and efficiency. One of the many required components of an optical network is an optical switching device. An optical switching device has the capability of switching an individual light signal between at least two different locations. Usually the optical signal is first demultiplexed or dispersed and the individual channels are switched and routed to specific locations. It is preferable to optically switch the optical signals rather than converting them to electrical signals and then switching them with conventional electrical switching techniques to maintain many of the advantages of optical networks.

The field of optical switching has progressed rapidly in the last decade. For large bandwidth applications, it is important that the optical switches be extremely small to allow many channels to be switched in a relatively small amount of space. One of the newest types optical switches fit into the general category of micro-electromechanical systems (MEMS). The size of these devices is typically on the order of microns. Three narrower categories of MEMS optical switches have emerged as the most promising design configurations: piezoelectric, electrostatic and electromagnetic. All of these switches utilize micro-mirrors to switch or reflect an optical channel or signal from one location to another depending on the relative angle of the micro-mirror. Therefore, the micro-mirror must be moved between at least two orientations. These movements must be extremely precise to properly route the optical signal to the desired location. Over time it is likely for the mirror to move into an improper orientation causing degradation or loss of the signal being switched. In addition, it is possible for debris to become lodged within the gap between the micro-mirror and the base and consequently interfere with the movement of the micro-mirrors thereby affecting the orientations of the micro-mirrors.

Due to increased bandwidth requirements on optical systems, optical switches are commonly arrayed to form devices that can switch many different channels. These arrayed switching devices are commonly used to add and drop individual signals from a dense wavelength division multiplexed (DWDM) signal. An array of switches is simply a large group of individual switches that are positioned or configured together to independently switch multiple channels. Since most optical switches contain moving parts, they tend to occupy unnecessarily large amounts of space in relation to the channels they are switching. Therefore, a large array of optical switches will generally require a relatively significant amount of precious space in an optical system. Certain types of optical switches do not lend themselves to being easily positioned together. For example, many MEMS based micro-mirror type switches cannot simply be stacked together or positioned adjacent to one another to form an arrayed switching device. These types of switches must be individually positioned in relation to one another to form an arrayed switching device.

Therefore, there is a need in the industry for an efficient optical switch that consumes low power, has no moving parts, is relatively small and is durable in relation to other optical switches.

BRIEF SUMMARY OF THE INVENTION

These and other problems in the prior art are addressed by embodiments of the present invention, which relates to a polarization based optical switch that is particularly useful for switching optical signals in an optical networking environment.

According to one aspect of the invention, a single 1×2 optical switch generally comprises two reflection members, two polarization beam splitters and two polarization rotators. The reflection members are cube-like transparent elements which contain a mirror angled at 45 degrees. The polarization beam splitters are cube-like transparent elements which contain a beam splitter angled at 45 degrees. The beam splitter is configured to reflect light of one polarization type and transmit light of a different polarization type. The polarization rotators are optical elements that rotate the polarization of an input beam from one polarization type to another polarization type when an electrical field is applied.

The six components in this embodiment are configured in a generally square configuration. The first polarization beam splitter is positioned in the top left portion of the optical switch and is oriented such that the beam splitter transmits a portion of the optical signal laterally and reflects the remainder of the optical signal downward. The reflection members are positioned in the top right and bottom right portions of the optical switch such that the mirrors within the reflection members are facing the center of the optical switch. The second polarization beam splitter is positioned in the bottom left portion of the optical switch and is oriented such the beam splitter goes from the bottom left to the top right portion of the cube-like polarization beam splitter element. The first polarization rotator is located in between the two polarization beam splitters on the left side of the optical switch. The second polarization rotator is located in between the two reflection members on the right side of the optical switch. Of course, the use of the terms "left" and "right" and other such terms that imply relative position of elements is for convenience only, and the elements of the optical components of the invention are not limited to these positions.

In operation, the 1×2 optical switch receives an input signal containing a first and a second polarization type. The input signal transmits into the first polarization beam splitter from a lateral orientation. The first polarization beam splitter reflects the first polarization type and transmits the second polarization type portions of the input signal. The second polarization type portion of the input signal is transmitted into the first reflection member such that it is reflected into the second polarization rotator. The first polarization type portion of the input signal is reflected by the beam splitter into the first polarization rotator. If the switch is in the OFF state, the first and second polarization type portions of the input signal will transmit normally through the polarization rotators. If, however, the switch is in the ON state, the first and second polarization type portions of the input signal are manipulated by the polarization rotators. In the ON state, the first polarization rotator changes the polarization of the first polarization type portion of the input signal into the polarization of the second type, and the second polarization rotator changes the polarization of the second polarization type portion of the input signal into the polarization of the first type. Regardless of the state of the optical switch, the second polarization portion of the input signal transmits into the second reflector, such that it is reflected into the second beam splitter. The first polarization type portion of the input signal transmits into the second polarization beam splitter. The second polarization beam splitter recombines the first and second polarization portions of the input signal and directs them to one of two locations depending on the state of the switch.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to a polarization based optical switch that utilizes polarization rotators, polarization dependent beam splitters, and reflection members. As will be described in further detail below, the optical switch is capable of redirecting an input signal between one of two locations. Other embodiments illustrate how the same principle can be applied to optical switches which accept multiple input signals. Also, while embodiments of the present invention are described in the context of optical signal switching mechanisms, it will be appreciated that the teachings of the present invention are applicable to other applications as well.

Polarization is commonly used in optical networks to create filters and attenuators. Light may be polarized or unpolarized depending on its origin. For example, lasers typically produce highly polarized light, whereas the light produced by the sun is unpolarized. Unpolarized light does not mean the light has no polarization, it simply means that the light contains many different polarizations. One type of optical device that utilizes polarization is a mechanical attenuator that contains two or more polarizing elements to attenuate the light signal. When the polarizing elements are rotated with respect to one another the output light is attenuated as a function of the angle between the polarization axis of the polarizing elements. For two polarizing elements, this phenomenon follows Malus' law and is stated mathematically: $I_{out}=I_{in} \cos^2 \theta$. Where $\theta$ is the angular difference between the polarization axis of the two polarizing elements. Attenuators of this type typically include some form of rotation mechanism to rotate one of the polarizing elements with respect to the other one. It is necessary for the optical attenuator to be variable such that a user can adjust the amount of attenuation for a particular situation. A polarizing element may be a standard polarizer or a crystal containing polarization properties. These crystals include quartz, BBO, YVO4 and the like. Although these types of attenuators are effective at attenuating and filtering an incoming light signal, it is undesirable to include moving parts in an optical element.

Figure 1:
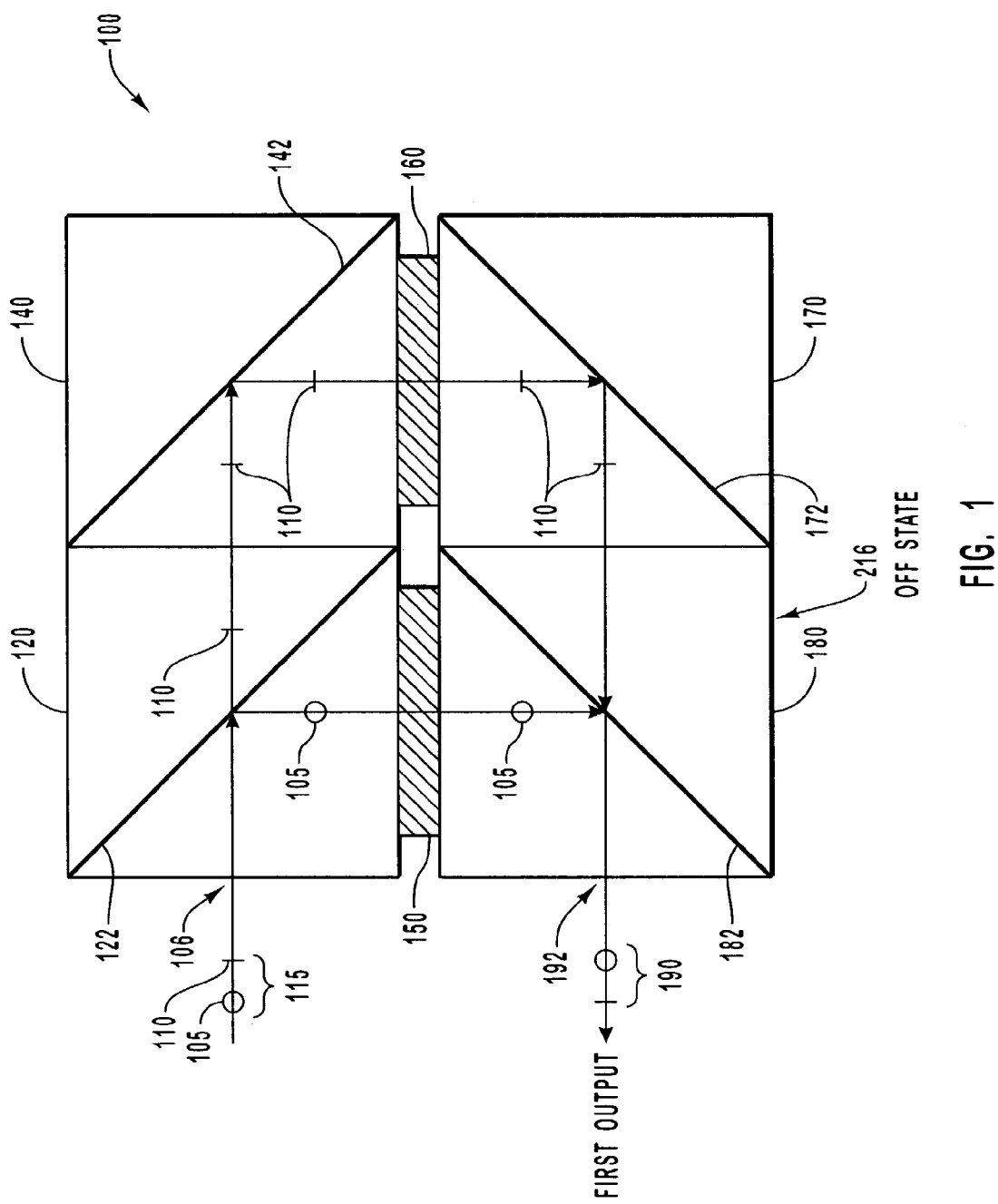
FIG. 1 illustrates a profile view of a single 1×2 polarization based optical switch in the OFF state.

Referring first to FIG. 1, a profile view of a single 1×2 polarization based optical switch in the OFF state, designated generally at 100, is shown. The optical switch 100 is said to be a 1×2 switch because there is one input location 106 and two output locations 192, 216. The optical switch 100 further includes two polarization beam splitters 120, 180, two reflection members 140, 170 and two polarization rotators 150, 160. The polarization beam splitters 120, 180 are cube-like structures containing a polarization sensitive film 122, 182 angled at 45 degrees within the structure. The polarization sensitive film 122, 182 is configured to reflect light of a certain polarization and transmit light of a different polarization. These films 122, 182 may also be referred to as filters because certain types of light are allowed to pass while other light is reflected. The polarization beam splitters 120, 180 are positioned in the optical switch 100 on the left side as illustrated in FIG. 1. The reflection members 140, 170 are also cube-like structures, but contain mirrors 142, 172 angled at 45 degrees within the structure. The mirrors 142, 172 may be any optical reflection element that reflects all light equally without differentiation of polarization. The reflection members 140, 170 are positioned in the optical switch 100 on the right side as illustrated in FIG. 1. The polarization rotators 150, 160 are optical elements configured to rotate the plane of polarization of an input signal. For example, a polarization rotator can be used to convert a vertically polarized input signal into a horizontally polarized output signal. Polarization rotators include faraday rotators and liquid crystal rotators, which are described in more detail with reference to FIG. 3. The polarization rotators 150, 160 are positioned in the middle of the optical switch as illustrated in FIG. 1. It is noted that the terms "left," "right," "top," "bottom," "middle," and other such terms that imply relative positions of the various elements of the optical components of the invention are used for convenience only. These terms do not require the optical switches of the invention to have any particular orientation. The elements of the optical switches of the invention can be described in other terms or can have other relative positions so long as the polarization beam splitters, the reflection members, and the polarization rotators of the switch operate in the manner described generally herein.

With continued reference to FIG. 1, an input signal 115 is transmitted into the optical switch 100 for switching purposes. The input signal 115 is an optical data signal containing modulated information. If the input signal 115 is transmitted from an optical fiber, it may need to be collimated before being transmitted into the optical switch 100. The input signal 115 further comprises a first polarization portion 105 and a second polarization portion 110. The first and second polarization portions 105, 110 are portions of the input signal 115 that contain planes of polarization that differ by a fixed amount. The first and second polarization portions 105, 110 are illustrated respectively by a circle and a line to show which portions of the input signal 115 is transmitted into which portions of the optical switch 100. The input signal 115 can be split into the polarization portions and then recombined without affecting the integrity of the information contained within the signal.

In operation, the optical switch 100 illustrated in FIG. 1 receives the input signal 115 into the first polarization beam splitter 120. The first polarization beam splitter 120 transmits the second polarization portion 110 through the polarization sensitive film 122 and reflects the first polarization portion 105 in a downward direction. The first polarization portion 105 is redirected into the first polarization rotator 150. The second polarization portion 110 transmits through the remainder of the first polarization beam splitter 120 and into the first reflection member 140. The mirror 142 within the first reflection member 140 redirects the second polarization portion 110 into the second polarization rotator 160. Since the optical switch 100 is in the OFF state, the first and second polarization rotators 150, 160 do not affect the polarization status of the first and second polarization portions 105, 110. The first polarization portion 105 transmits unaffected through the first polarization rotator 150 and into the second polarization beam splitter 180. The second polarization portion 110 transmits unaffected through the second polarization rotator 160 and into the second reflection member 170. The second reflection member 170 redirects the second polarization portion 110 into the second beam splitter 180. The second polarization beam splitter 180 reflects the first polarization portion 105 and transmits the second polarization portion 110, allowing the two portions of the input signal to recombine into the output signal 190 located at the first output location 192.

Figure 2:
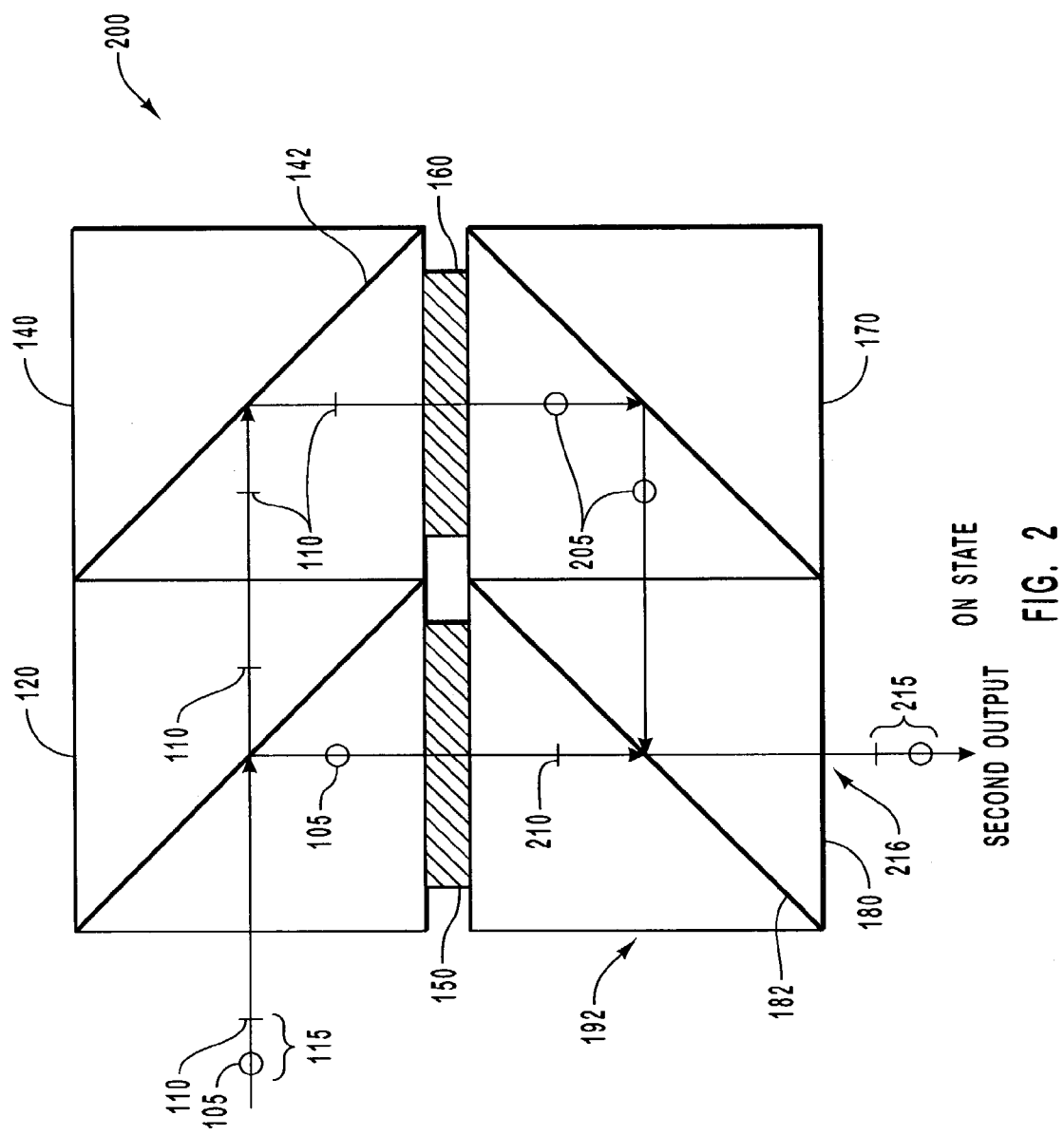
FIG. 2 illustrates a profile view of a single 1×2 polarization based optical switch in the ON state.

Reference is next made to FIG. 2, which illustrates a profile view of the single 1×2 polarization based optical switch of FIG. 1 in the ON state, designated generally at 200. The optical switch 200 is the same as the optical switch illustrated in FIG. 1 except that the polarization rotators 150, 160 are turned on so as to rotate the plane of polarization of all incoming light signals. The incoming light signal 115 is transmitted into the optical switch 200 in the same manner as described above with reference to FIG. 1. The first polarization portion 105 is manipulated by the first polarization rotator 150 so as to produce a first resulting signal 210 with the same plane of polarization as the second polarization portion 110. The second polarization portion 110 is manipulated by the second polarization rotator 160 so as to produce a second resulting signal 205 with the same plane of polarization as the first polarization portion 105. The second beam splitter 180 transmits the first resulting signal 210 and reflects the second resulting signal 205 because of their respective planes of polarization. The second beam splitter 180 is the same as the second beam splitter illustrated in FIG. 1, but since the polarizations of the two resulting signals 210 205 are switched, the second beam splitter 180 directs the two resulting signals 210, 205 to a second output location such that they recombine to form a second output signal 215 at a second output location 216. The second output signal 215 can include the same information as the output signal 190 from the optical switch 100 in FIG. 1. Therefore, by turning on or off the polarization rotators 150, 160, an input signal can be switched between one of two locations.

Figure 3:
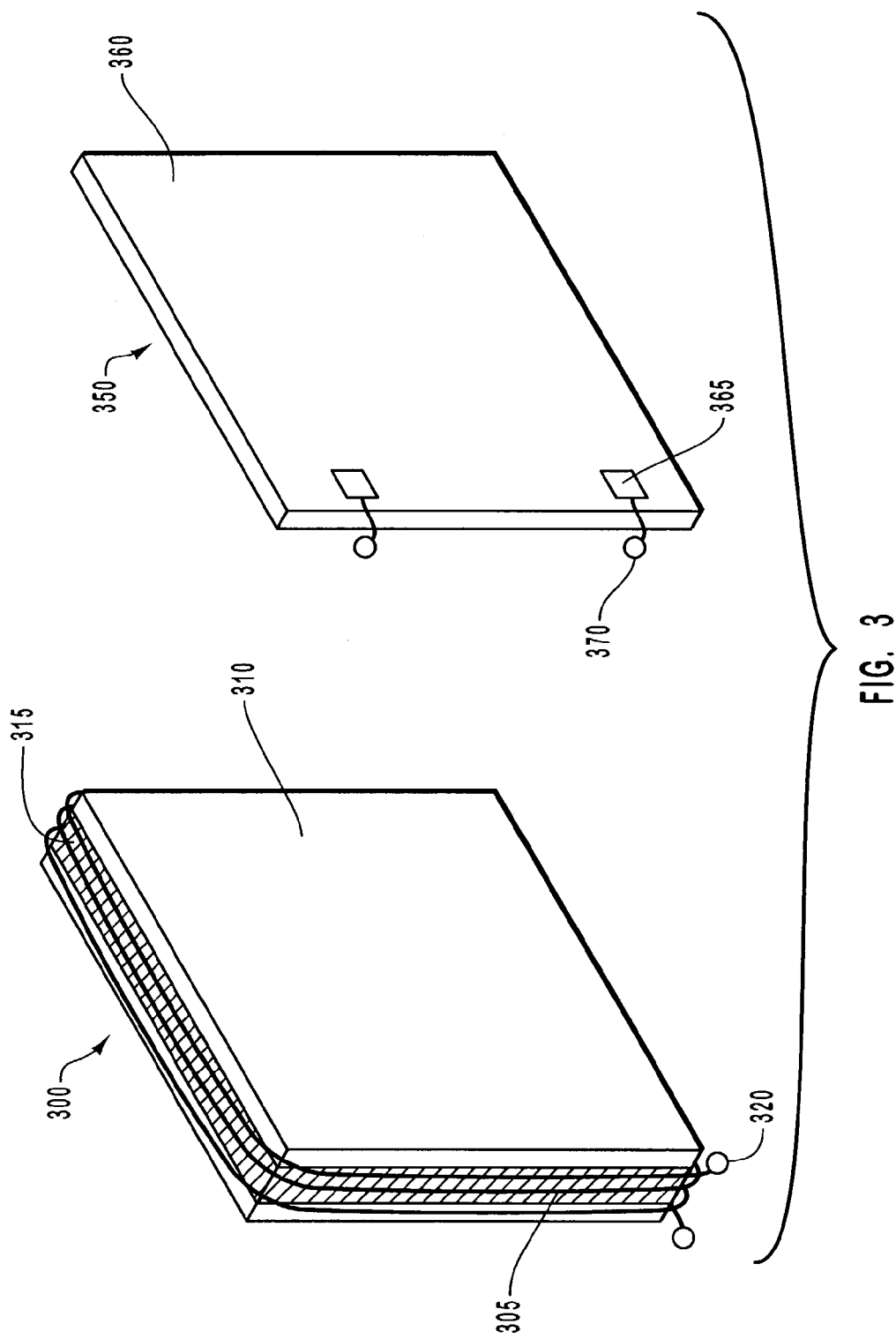
FIG. 3 illustrates a profile view of a faraday polarization rotator and a liquid crystal polarization rotator.

Reference is next made to FIG. 3, which illustrates a profile view of a faraday polarization rotator designated at 300 and a liquid crystal polarization rotator designated at 350. These are two different types of polarization rotators the can be used in the various embodiments of the present invention to rotate the plane of polarization when the switch is in the ON state. The faraday rotator 300 further includes a garnet 310, a magnetic material 315, a conductive wire 305 and a pair of contact points 320. Although illustrated in a rectangular manner, the faraday rotator 300 may be any shape. The faraday rotator 300 utilizes the Faraday effect, according to which a magnetic field has the capability of affecting the polarization of light. The garnet 310 is enclosed by the magnetic material 315 and wrapped lengthwise with a conductive wire 305 for the purpose of inducing a magnetic field upon light transmitting through the garnet. The magnetic material 315 in this embodiment is composed of a hard ferromagnetic material. Ferromagnetic materials are easily magnetized and are capable of producing relatively large forces. A hard ferromagnetic material has a wide hysteresis curve (B v H or Magnetic curve) and therefore has the ability to generate remnant magnetization even after an external magnetic field is turned off. The conductive wire 305 is wrapped around the garnet 310 and the magnetic material 315 to induce an external magnetic field. The conductive wire 305 is electrically connected to a pair of contact points 320 which are then connected to outside circuitry (not shown) for the purpose of applying a current through the conductive wire 24 at a particular time and of a particular magnitude. By applying a current to the contact points 320 and consequently through the coiled conductive wire 305, a magnetic field is created onto the magnetic material 315. The magnitude of the magnetic field is proportional to the magnitude of the current and the amount of rotation induced upon the polarity of the light signal transmitted through the garnet. Because of the inclusion of the hard ferromagnetic material between the garnet 310 and the conductive wire 305, the current only needs to be pulsed in order to create a magnetic field upon the garnet 310. Likewise, the remnant magnetization of the hard ferromagnetic material can be turned off by inducing an external magnetic field with the conductive wire 305 of the same magnitude and an opposite polarity. The polarization of the light signal exiting the faraday rotator 300 is variable depending on the magnitude of the magnetic field generated by the conductive wire 305. In the optical switch embodiments of the present invention, a faraday rotator 300 is configured to rotate the plane of polarization of an input signal by a fixed amount.

With continued reference to FIG. 3, the liquid crystal rotator 350 further includes a liquid crystal 360, a pair of transparent contacts 365 and a pair of electrical contacts 370. When a voltage is induced across the pair of electrical contacts 370, a current is passed through the transparent contacts 365 and onto the liquid crystal 360, The current causes the liquid crystal to rotate the plane of polarization of an input light signal. Although illustrated in a rectangular manner, the liquid crystal rotator 350 may be any form of liquid crystal polarization rotation device. Many liquid crystal rotators are known in the art including a twisted nematic liquid crystal cell. In the optical switch embodiments of the present invention, a liquid crystal rotator 350 is configured to rotate the plane of polarization of an input signal by a fixed amount.

Figure 4:
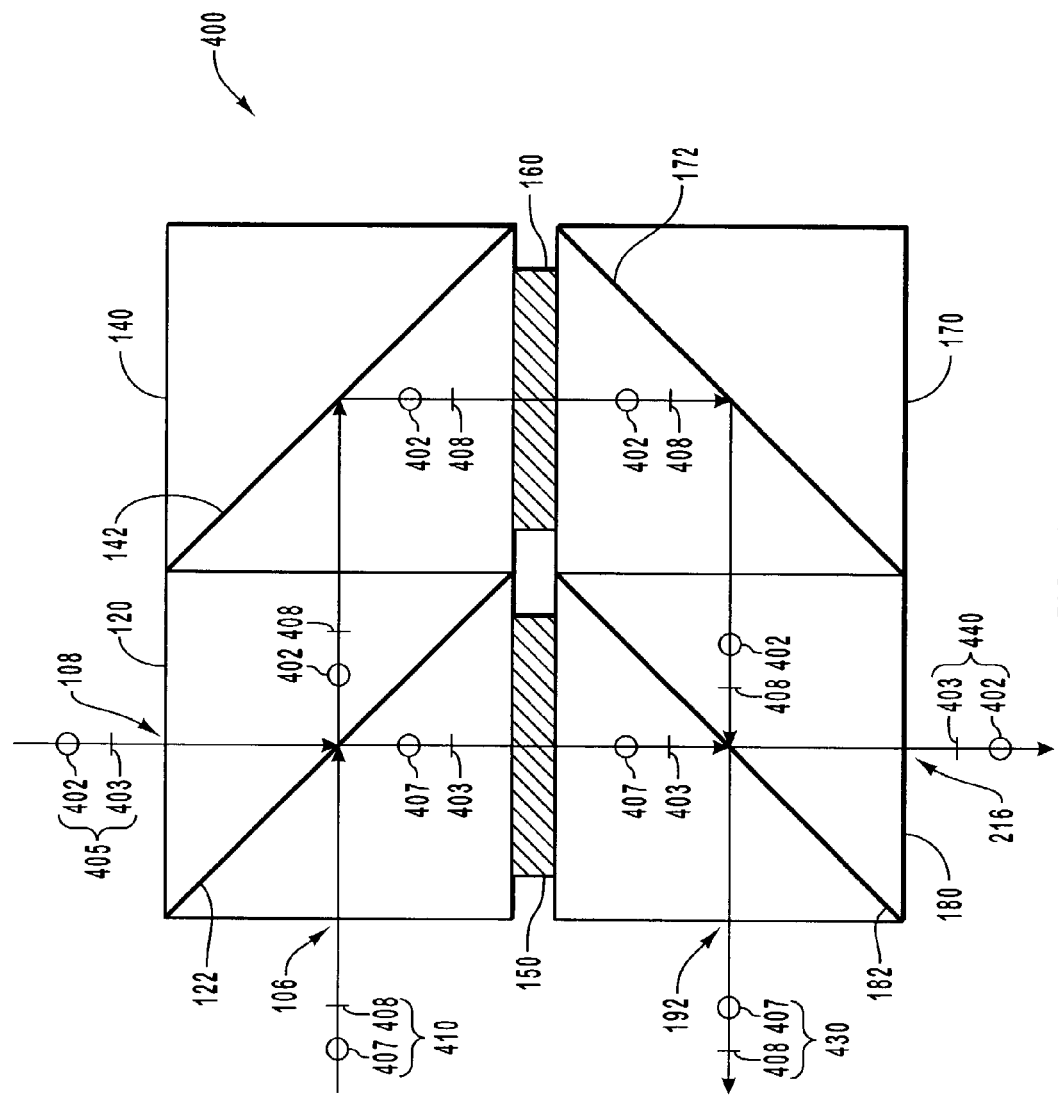
FIG. 4 illustrates a profile view of a single 2×2 polarization based optical switch.

Reference is next made to FIG. 4, which illustrates a profile view of a single 2×2 polarization based optical switch, designated generally at 400. The optical switch 400 is said to be a 2×2 switch because there are two input locations 106, 108 and two output locations 192, 216. The optical switch 400 further includes two polarization beam splitters 120, 180, two reflection members 140, 170 and two polarization rotators 150, 160. These components are described in more detail with reference to FIGS. 1-3. In this embodiment, there are two input signals 405, 410. Input signal 405 includes a first polarization portion 402 and a second polarization portion 403. Likewise, input signal 410 includes a first polarization portion 407 and a second polarization portion 408. In addition to simply switching an output signal between one of two locations, this embodiment can be used to add and drop signals from one another.

In operation, the optical switch 400 illustrated in FIG. 4 operates similarly to the 1×2 optical switch illustrated in FIGS. 1 and 2. The first optical signal 410 is transmitted laterally into the first polarization beam splitter 120. The first polarization portion 407 is reflected and the second polarization portion 408 is transmitted. Likewise, the second optical signal 405 is transmitted downward into the first polarization beam splitter 120. The first polarization portion 402 is reflected and the second polarization portion 403 is transmitted. Since the first and second optical signals 405 410 are positioned orthogonally to one another, the angles of reflection and transmission are also orthogonal. This property can be used as desired to combine the signals. For instance, the reflected polarization portion of the first optical signal 410 can combine with the transmitted polarization portion of the second optical signal 405 and vice versa. In general, the 2×2 switch of FIG. 4 can be used to combine signals, drop signals, or switch signals from either of the input locations 106, 108 to either of the output locations 192, 216.

As shown in FIG. 4, the first and second polarization portions 402, 408 transmit into the first reflection member, whereby they are reflected into the second polarization rotator 160. The first and second polarization portions 407, 403 transmit directly into the first polarization rotator 150. As described above with reference to FIGS. 1-3, the polarization rotators 150, 160 have the ability to manipulate the plane of polarization of an input signal in response to an electrical current. Two different types of suitable polarization rotators are described in more detail with reference to FIG. 3. The illustrated embodiment is in an OFF state, such that the polarization rotators simply transmit the optical signals unaffected. The polarization portions 407, 403 transmitted through the first polarization rotator 150 are then transmitted into the second polarization beam splitter 180, whereby the first polarization portion 407 is reflected into the first output signal 430 and the second polarization portion 403 is transmitted into the second output signal 440. The polarization portions 402, 408 transmitted through the second polarization rotator 160 are then transmitted into the second reflection member 170, whereby they are reflected into the second polarization beam splitter 180. The first polarization portion 402 is reflected into the second output signal 440 and the second polarization portion 408 is transmitted into the first output signal 430. Therefore, the first output signal 430 is comprised of the same first polarization portion 407 and second polarization portion 408 as the first optical signal 410. Likewise, the second output signal 440 is comprised of the same first polarization portion 402 and second polarization portion 403 as the second input signal 405.

Figure 5:
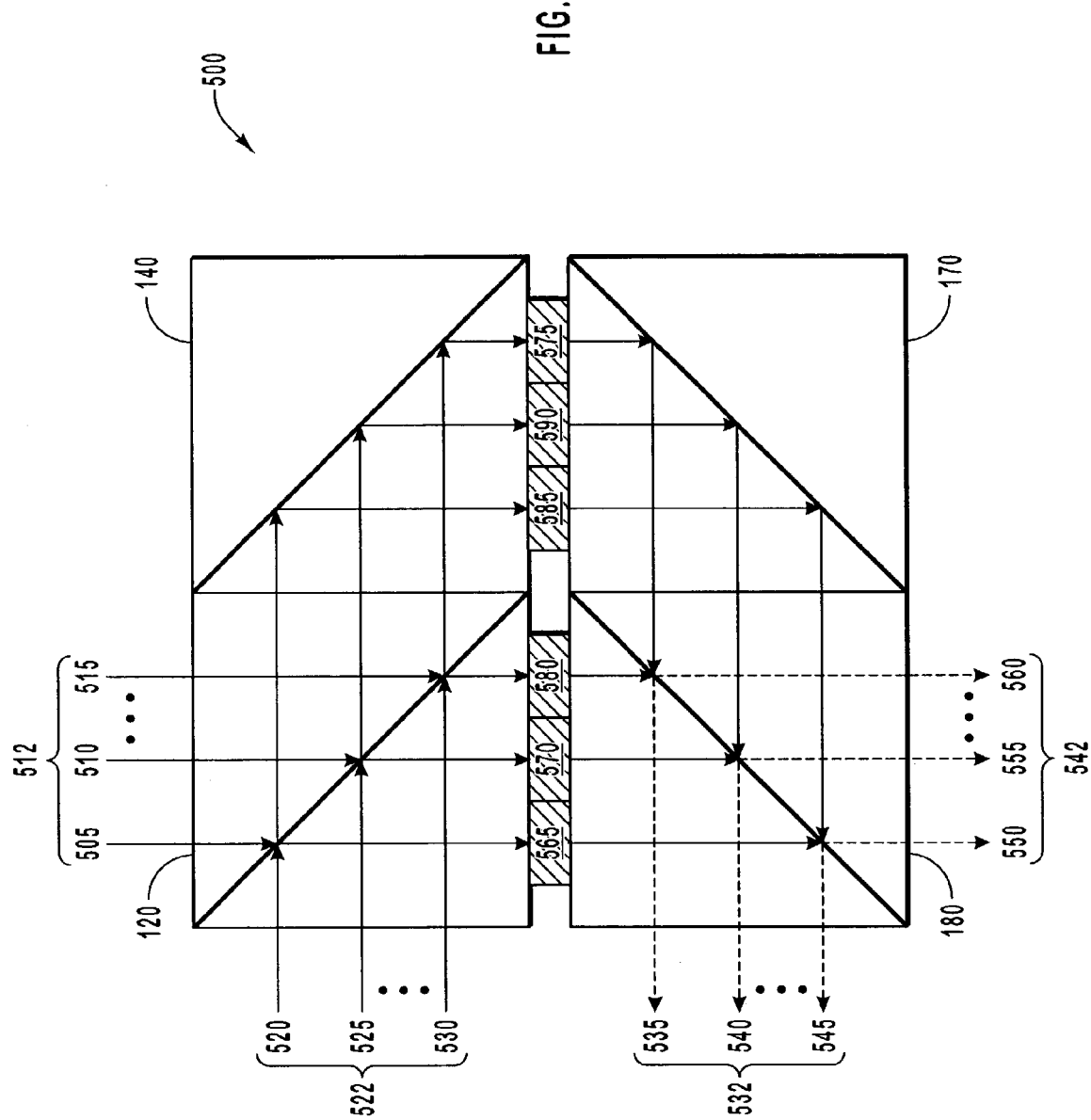
FIG. 5 illustrates a profile view of a "n×n" polarization based optical.

Reference is next made to FIG. 5, which illustrates a profile view of an "n×n" polarization based optical switch, designated generally at 500. This embodiment is referred to as an n×n optical switch because there can be an essentially unlimited number of input and output signals by simply positioning the signals closer to one another. The optical switch 500 further includes two polarization beam splitters 120, 180, two reflection members 140, 170 and multiple polarization rotators 565, 570, 580, 585, 590, 595. These components are described in more detail with reference to FIGS. 1-3. The number of polarization rotators in the optical switch 500 is generally equal to the number of input signals. For example, if the optical switch accepts 14 input signals, seven from each optical input group, there would be 14 polarization rotators. The 2×2 optical switch illustrated in FIG. 4 has two input locations and two output locations from which optical signals are input and output from the optical switch. The n×n optical switch 500 simply cascades multiple optical signals at each of these four locations as would be the case with a optical ribbon or multiple optical fibers aligned together laterally.

The input optical signals can be grouped into a first input group 522 and a second input group 512. The first input group further includes a first optical signal 520, a second optical signal 525, and an nth optical signal 530, meaning that an essentially unlimited number of optical signals can be cascaded between the second optical signal 525 and the nth optical signal 530. Likewise, the second input group 512 includes a first optical signal 505, a second optical signal 510 and an nth optical signal 515, meaning that an essentially unlimited number of optical signals can be cascaded between the second optical signal 510 and the nth optical signal 515. The output signals can also be grouped into a first output group 532 and a second output group 542. The first output group 532 includes a first output signal 135, a second output signal 540, and an nth output signal 545, meaning that an essentially unlimited number of output signals can be cascaded between the second output signal 540 and the nth output signal 545. The second output group 542 includes a first output signal 550, a second output signal 555, and an nth output signal 560, meaning that an essentially unlimited number of output signals can be cascaded between the second output signal 555 and the nth output signal 560.

The operation of the nxn optical switch 500 is almost identical to the 2×2 optical switch described with reference to FIG. 4, except for the additional signals added at each of the two input locations and the two output locations and the additional polarization rotators. These additional signals all contain a first and a second polarization portion (not shown), which are split by the first polarization beam splitter 120. Some of the polarization portions transmit into the first reflection member 140 and are reflected into individual polarization rotators 585 590 595. Likewise, the remaining polarization portions transmit into individual polarization rotators 565 570 580 located below the first polarization beam splitter 120. The polarization portions of the various optical signals are transmitted together in the same manner as the first and second polarization portions are in the 2×2 optical switch described with reference to FIG. 4. In the ON state the polarizations of each of the polarization portions are flipped by the multiple polarization rotators 565, 570, 580, 585, 590, 595. The polarization portions remain together and are transmitted into the second polarization beam splitter 180. Some of the polarization portions are reflected into the second polarization beam splitter 180 by the second reflection member 170. The second polarization beam splitter 180 reflects certain polarization portions and transmits other polarization portions, depending on their relative plane of polarization, thereby allowing for the control of switching individual optical signals between the first and second output groups 532, 542.

Figure 6:
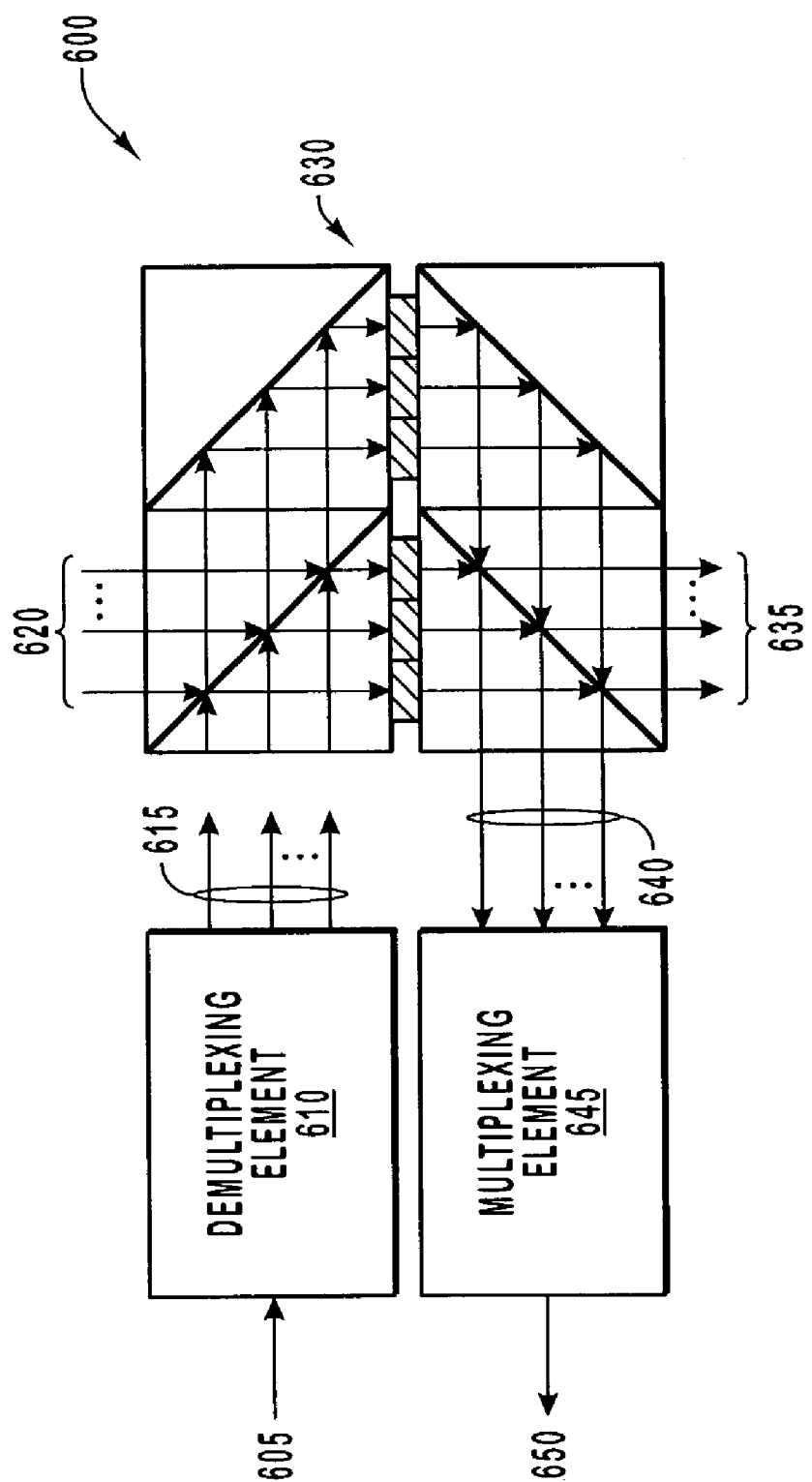
FIG. 6 illustrates an optical add/drop module utilizing the n×n polarization based optical switch illustrated in FIG. 5.

Reference is next made to FIG. 6, which illustrates an optical add/drop module utilizing the nxn polarization based optical switch illustrated in FIG. 5, designated generally at 600. An optical add/drop module (OADM) is one application of the nxn optical switch illustrated in FIG. 5. OADMs are used to add and drop individual channels from a particular group of channels. For example, in a telephone network a initiating party calls a receiving party. The telephone system contains multiple telephone communication signals, switches and lines to connect all of the different parties. To connect the initiating party to the receiving party, a certain set of switches must be configured to add the signal from the initiating party and drop to the signal to the receiving party. There are many other applications in which an OADM can be used in an optical network to manage a high bandwidth communication line. The OADM 600 further includes a demultiplexing element 610, a polarization based nxn optical switch 630, and a multiplexing element 645. The demultiplexing element 610 and the multiplexing element 645 utilize some form of dispersion member (not shown) to disperse or congregate multiple optical signals. Dispersion members include prisms and diffraction gratings. A suitable polarization based nxn optical switch 630 is described in more detail with reference to FIG. 5.

In operation, the OADM 600 accepts an input signal 605 containing multiple optical signals or channels. Typically, each individual optical signal or channel has a unique wavelength such that all of the optical signals can travel together without interference. These signals may be transmitted together in an optical fiber or some other form of optical waveguide. The input signal 605 is transmitted into the demultiplexing element 610 wherein the individual signals are dispersed by position so as to form the first switch input group 615. The first switch input group 615 can contain an essentially unlimited number of individual signals cascaded next to one another. The first input group 615 is input into the polarization based nxn optical switch 630 as shown. The second input group 620 also could contain an infinite number of individual signals and is likewise input into the polarization based nxn optical switch 630 as shown. The second input group 620 contains the individual signals which may be added to the resulting optical group. The polarization based nxn optical switch 630 splits the individual signals into individual polarization portions which are then grouped together and transmitted through the switch. The operation and components of the polarization based nxn optical switch 630 is described in more detail with reference to FIGS. 1-5. Essentially, each individual channel can be switched between one of two locations so as to either include the channel in the first output group 640 or the second output group 635. The channels directed to the second output group 635 are essentially dropped from the optical signal. The first output group 640 is transmitted into the multiplexing element 645 such that they are combined together into a single output signal 650. The output signal 650 may be directed into an optical fiber or some other optical waveguide.

Figure 7:
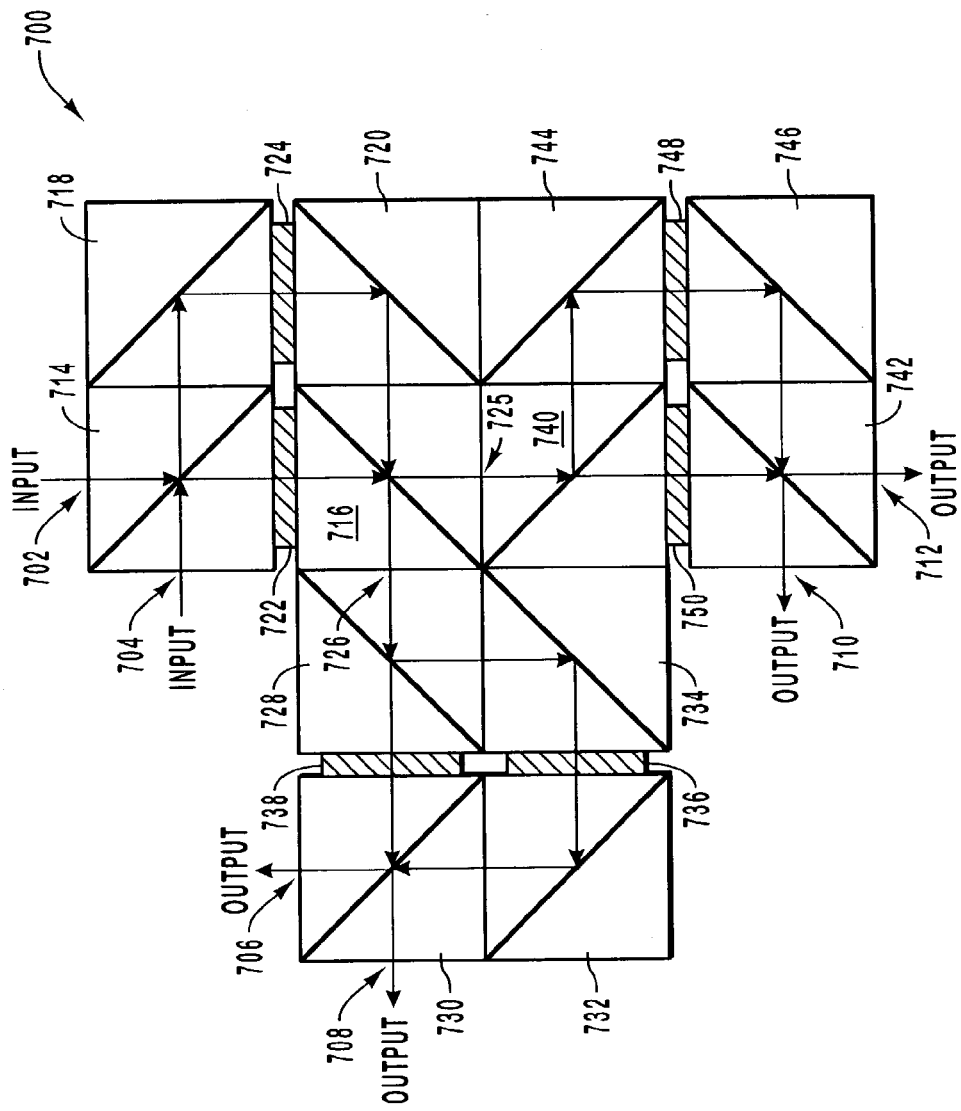
FIG. 7 illustrates a 2×4 polarization based optical switch, illustrating the manner in which higher-order optical switches can be assembled according to the invention.

FIG. 7 illustrates a higher-order optical switch shown generally at 700, having two input locations 702 and 704 and four output locations 706, 708, 710, 712. Optical switch 700 includes polarization beam splitters 714, 716; reflection members 718, 720; and polarization rotators 722, 724. The portion of optical switch 700 that includes elements 714-724 is similar to the 2×2 switch of FIG. 4. Moreover, viewing elements 714-724 as a 2×2 switch, the locations thereof that are analogous to the output locations of the 2×2 switch are shown at 725, 726.

Each of these two intermediate output locations 725, 726 transmit optical signals into one of two additional structures of optical switch 700 that operate as 1×2 optical switches, similar to the 1×2 optical switch of FIGS. 1 and 2. In particular, a first structure that is analogous to a 1×2 optical switch includes polarization beam splitters 728, 730; reflection members 732, 734; and polarization rotators 736, 738. Similarly, the second structure of optical switch 700 that is analogous to a 1×2 optical switch includes polarization beam splitters 740, 742; reflection members 744, 746; and polarization rotators 748, 750. Each of these structures that is analogous to a 1×2 switch operates to add one additional output location to the overall switch.

In general, a plurality of modules each being analogous to a 1×2 switch can be cascaded in the manner exemplified in FIG. 7 to create an optical switch having a desired number of outputs. Moreover, an 2×n optical switch can be created by cascading n−2 switching modules that are analogous to a 1×2 switch to a 2×2 optical switch. Assuming that the modules can be physically positioned one next to another as needed, this technique can be used to assemble optical switches having higher numbers of output locations. Moreover, the polarization beam splitters and the reflection members described herein can be assembled so as to direct the optical signals in three dimensions rather than directing them in a single two-dimensional plane as shown in FIGS. 1-2 and 4-7. Adding an additional dimension in this manner can serve to enable more switching modules to be assembled together, thereby providing the possibility of optical switches having significantly greater numbers of output locations.

Figure 8:
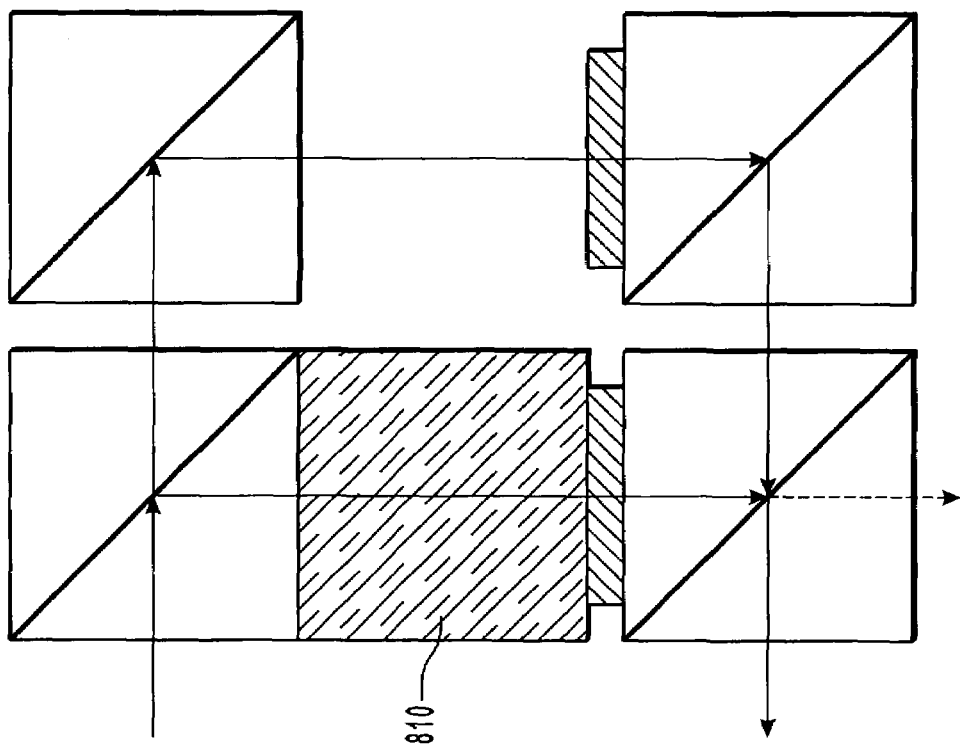
FIG. 8 illustrates a refractive index matched element used for matching the phase difference between the polarization components of the optical signal that passes through the switch.

The optical switches of the invention in effect operate as Mach-Zehnder optical interferometer and, during the course of optical switching, there is some polarization dispersion introduced. To compensate for the polarization dispersion, a refractive index matched material can be placed inside the switches and make it substantially dispersion free. FIG. 8 illustrates the positioning of the refractive index matched material in the switches of the invention. A a refractive index matched element 810 is placed as shown in FIG. 8 for matching the phase difference between the two different polarizations, which is particularly important when the switches of the invention are used for long haul communication networks.

Figure 9:
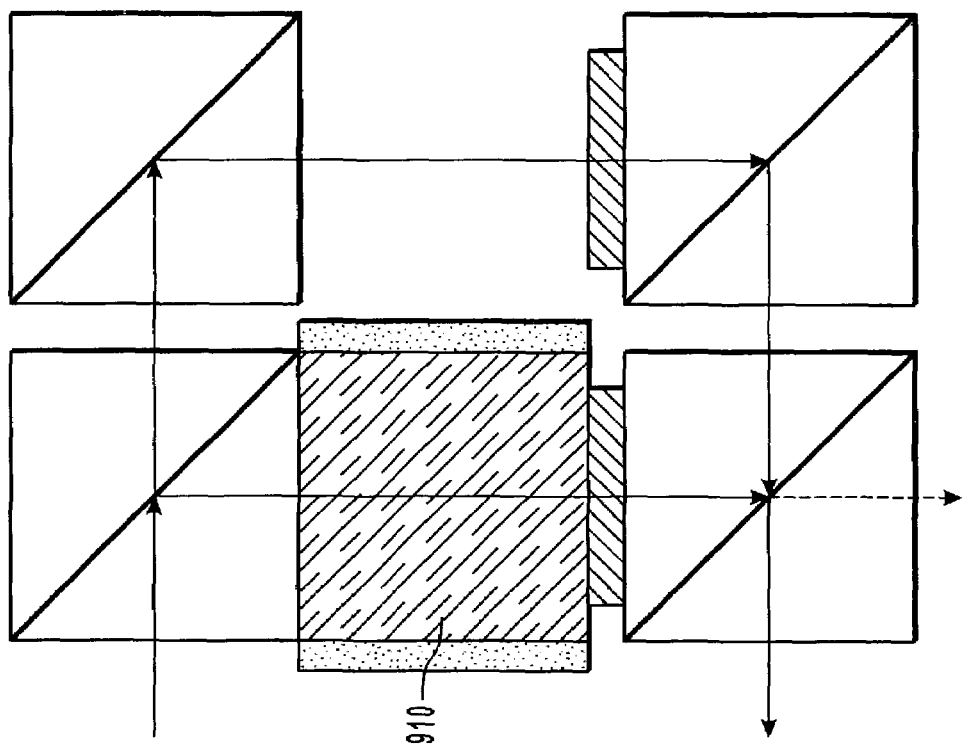
FIG. 9 illustrates a refractive index tunable element for compensating for polarization dispersion in the optical switches of the invention.

The ability to perform polarization dispersion compensation can be further enhanced by positioning a refractive index tunable element in the switch. By tuning the refractive index of element 910, the phase can be changed for either s polarization or for the p polarization. The refractive index of element 910 can be changed by applying a voltage across the element as illustrated in FIG. 9.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. An optical switch comprising:
a first polarization beam splitter configured to receive an input optical signal and reflect a first polarization portion having a first plane of polarization and transmit a second polarization portion having a second plane of polarization
at least two reflection members each configured to receive the second polarization portion at a particular angle and reflect the second polarization portion at an output angle corresponding to the particular angle of which the second polarization portion is received;
a second polarization beam splitter positioned to combine the first polarization portion with the second polarization portion and direct the combined first and second polarization portions to one of a plurality of output locations; and
at least two polarization rotators configured to be turned on and off to selectively rotate the plane of polarization of an optical signal a respective one of the first and second polarization portions in response to an electrical input to each polarization rotator, wherein each polarization rotator is located such that the first and second polarization portions which transmit through the respective polarization rotators are directed to the second polarization beam splitter.

2. The optical switch of claim 1, wherein the reflection members are cube-like structures with six sides that contain a reflection device positioned at 45 degrees with respect to one of the sides.

3. The optical switch of claim 1, wherein one of the reflection members is positioned to redirect the second polarization portion into the respective polarization rotator.

4. The optical switch of claim 1, wherein one of the polarization beam splitters is positioned in the optical switch to receive multiple optical signals from two different directions.

5. The optical switch of claim 1, wherein one of the polarization beam splitters is positioned to direct individual combined polarization portions between two different output locations.

6. The optical switch of claim 1, wherein the at least two polarization beam splitters are cube-like structures that contain a polarization sensitive film angled at 45 degrees with respect to one of a plurality of sides.

7. The optical switch of claim 1, wherein one of the at least two polarization beam splitters is in optical communication with one of the at least two reflection members and one of the at least two polarization rotators.

8. The optical switch of claim 1, wherein the input signal includes two polarization portion components wherein the plane of polarization of the two polarization portion components is orthogonal to one another.

9. The optical switch of claim 8, wherein the at least two polarization rotators are capable of switching the planes of the polarization of the first and second polarization portions to the plane of polarization of the other of the first and second polarization portion contained within a single optical channel.

10. The optical switch of claim 1, wherein the at least two polarization rotators are liquid crystal rotators.

11. The optical switch of claim 1, wherein the at least two polarization rotators are faraday rotators.

12. The optical switch of claim 1, wherein the number of polarization rotators is proportional to a number of independent optical input channels.

13. The optical switch of claim 1, wherein the optical switch is configured to receive two groups of input channels at two distinct input locations, wherein each group of input channels contains at least one single optical channel.

14. The optical switch of claim 1, wherein the optical switch is configured to receive one group of input channels at one distinct input location, wherein the group of input channels contains at least one single optical channel.

15. The optical switch of claim 1, wherein the optical switch is configured to output two groups of output channels at two distinct output locations, wherein each group of output channels contains at least one single optical channel.

16. The optical switch of claim 1, further comprising a refractive index matched element for matching the phase difference between the two polarization components of the optical signal passing through the optical switch.

17. The optical switch of claim 1, further comprising a refractive index tunable element for compensating for polarization dispersion.

18. An optical switch comprising:
means for receiving and separating at least two polarization portions of an optical signal based upon their respective planes of polarization;
means for reflecting at least one of the at least two polarization portions;
means for changing the planes of polarization of the polarization portions of the optical signal when the means for changing the planes of polarization is turned on in response to an electrical input, wherein the means for changing the planes of polarization transmits the polarization unaffected when turned off; and
means for recombining the polarization portions of the optical signal and directing the combined optical signal to one of a plurality of output locations.

19. The optical switch of claim 18, wherein the means for receiving and separating at least two polarization portions of an optical signal based upon their respective planes of polarization is a polarization beam splitter.

20. The optical switch of claim 18, wherein the means for changing the planes of polarization of the polarization portions of the optical signal is a polarization rotator.

21. The optical switch of claim 20, wherein the polarization rotator is a faraday rotator.

22. The optical switch of claim 20, wherein the polarization rotator is a liquid crystal rotator.

23. The optical switch of claim 18, wherein means for reflecting at least one of the at least two polarization portions includes at least one reflection member.

24. The optical switch of claim 18, wherein the means for recombining the polarization portions of the optical signal and directing the combined optical signal to one of a plurality of output locations is a polarization beam splitter.

25. A method of switching an optical signal between multiple locations using an optical switch, comprising the acts of:
receiving and separating at least two polarization portions of an optical signal based upon their respective planes of polarization;
twice reflecting a first of the at least two polarization portions;
depending on which one of a plurality of output locations of the optical switch is an output location that is to output an output signal, either:
passing the polarization portions of the optical signal through respective polarization rotators and changing the planes of polarization of the polarization portions using the respective polarization rotators; or
passing the polarization portions of the optical signal through the respective polarization rotators without changing the planes of polarization of the polarization portions;
recombining the polarization portions of the optical signal and directing the combined optical signal through said output location.

26. The method of switching an optical signal between multiple locations of claim 25, wherein the act of receiving and separating at least two polarization portions of an optical signal based upon their respective planes of polarization utilizes a polarization beam splitter.

27. The method of switching an optical signal between multiple locations of claim 25, wherein the polarization rotators are faraday rotators.

28. The method of switching an optical signal between multiple locations of claim 25, wherein the polarization rotators are liquid crystal rotators.

29. The method of switching an optical signal between multiple locations of claim 25, wherein the method further comprises redirecting the optical signal with a reflection member.

30. The method of switching an optical signal between multiple locations of claim 25, wherein the act of recombining the polarization portions of the optical signal utilizes a polarization beam splitter.

31. An optical add drop module comprising:
a multiplexing element configured to combine multiple optical channels into an output wavelength division multiplexed signal;
a demultiplexing element configured to disperse multiple optical channels from an input wavelength division multiplexed signal;
a polarization based optical switch including:
at least two reflection members configured to receive the input signal from the demultiplexing element at a particular angle and reflect the input signal at an output angle corresponding to the angle of the input signal;
at least two polarization beam splitters configured to reflect optical signals containing a first plane of polarization and transmit optical signals containing a second plane of polarization, wherein a first of the polarization beam splitters is positioned to receive and separate input signals into polarization portions according to polarity such that the polarization portions containing the second plane of polarization are directed to a first of the reflection members, and wherein a second of the polarization beam splitters is positioned to combine the polarization portions and direct the combined polarization portions to one of a number of output locations, wherein one of the plurality of output locations is associated with the multiplexing element; and
at least two polarization rotators configured to be turned on and off to receive and selectively rotate the plane of polarization of a respective one of the polarization portions by a fixed amount in response to an electrical input to a respective one of the polarization rotators, wherein each polarization rotator is located such that both polarization portions are directed to the second of the polarization beam splitters.

32. An optical switch having two input locations and n output locations, wherein n is greater than three, comprising:
a first switching module having two input locations and two output locations; and
a number of second switching modules, wherein the number of said second switching modules is n–2, wherein said second switching modules have one input location and two output locations, the input location of each of the second switching modules being coupled with either one of the two output locations of the first switching module or one of the two output locations of another of the second switching modules, wherein each of the second switching modules includes:
at least two reflection members configured to receive an input signal at a particular angle and reflect the input signal at an output angle corresponding to the angle of the input signal;
at least two polarization beam splitters configured to reflect optical signals containing a first plane of polarization and transmit optical signals containing a second plane of polarization, wherein one of the polarization beam splitters is positioned to receive and separate input signals into polarization portions according to polarity such that some of the polarization portions are directed to one of the reflection members, and wherein one of the polarization beam splitters is positioned to combine polarization portions and direct the combined polarization portions to one of a plurality of output locations; and
at least two polarization rotators configured to rotate the plane of polarization of an optical signal in response to an electrical input, wherein each polarization rotator is located such that optical signals which transmit through the polarization rotators are directed to one of the polarization beam splitters.

* * * * *

UNITED STATES PATENT AND TRADEMARK OFFICE
CERTIFICATE OF CORRECTION

PATENT NO.        : 7,263,250 B1
APPLICATION NO.   : 10/370893
DATED             : August 28, 2007
INVENTOR(S)       : Wang et al.

It is certified that error appears in the above-identified patent and that said Letters Patent is hereby corrected as shown below:

Column 1
Line 52, after "types" insert --of--

Column 6
Line 30, after "210" insert --,--
Line 43, change the first instance of "the" to --that--

Column 7
Line 61, after "405" insert --,--

Column 8
Line 44, change "595" to --575--

Column 9
Line 3, change "135" to --535--
Line 21, change "585 590 595" to --585, 590, 575--
Line 23, change "565 570 580" to --565, 570, 580,--
Line 30, change "595" to --575--
Line 47, change the first instance of "a" to --an--
Line 52, omit the first instance of "to"

Column 10
Line 56, change "an" to --a--

Column 11
Line 54, omit "an optical signal"

Signed and Sealed this

Sixth Day of July, 2010

David J. Kappos
*Director of the United States Patent and Trademark Office*